United States Patent [19]

Nelson

[11] 3,750,007

[45] July 31, 1973

[54] CONTROL CIRCUIT FOR LINEAR CONTROL OF BODE NETWORK

[75] Inventor: Richard Kent Nelson, Georgetown, Mass.

[73] Assignee: Bell Telephone Laboratories, Incorporated, Murray Hill, N.J.

[22] Filed: Oct. 2, 1972

[21] Appl. No.: 294,239

[52] U.S. Cl. .................................... 323/19, 323/68

[51] Int. Cl. .............................................. G05f 1/10

[58] Field of Search .................. 323/17, 19, 20, 68, 323/69; 338/7, 9, 23, 24; 330/23, 26, 29; 333/28

[56] References Cited

UNITED STATES PATENTS

| | | | |
|---|---|---|---|
| 3,375,434 | 3/1968 | Shapiro | 323/17 X |
| 3,466,572 | 9/1969 | Hanna et al. | 323/68 UX |
| 3,668,510 | 6/1972 | Tentarelli | 323/68 X |

OTHER PUBLICATIONS

Bell System Tech. Journal, Vol. 48, No. 4, April 1969, "Basic and Regulating Repeaters" (pages 865–887).

*Primary Examiner*—Gerald Goldberg
*Attorney*—W. L. Keefauver et al.

[57] ABSTRACT

The resistor that controls the single frequency loss of a Bode equalizer is automatically adjusted to make the single frequency loss variation a linear function of the inverse of an input control voltage. The input control signal is applied to a first input of a differential amplifier through a variable gain amplifier and to a voltage divider comprising the Bode control resistor and a resistance equal to the reference resistance of the Bode equalizer. The voltage across the Bode control resistor is applied to the other input of the differential amplifier, and the output of the differential amplifier is held constant by a feedback loop. The slope and the intercept of the linear function are controlled by the input control voltage and the gain of the variable gain amplifier, respectively. Also disclosed is a feedback controlled amplifier circuit for producing a control signal that is inversely proportional to sensed temperature.

8 Claims, 2 Drawing Figures

CONTROL CIRCUIT FOR LINEAR CONTROL OF BODE NETWORK

BACKGROUND OF THE INVENTION

This invention relates to communication signal equalizers—that is, to electronic networks that correct distortion introduced into communication signals as a result of their traveling over conductors. More particularly, it relates to circuitry for accurately controlling the amount of correction applied by such equalizers.

The loss distortion introduced by coaxial cable increases as the square root of the signal frequency. At any single frequency it varies linearly with temperature changes and cable length. As the bandwidth and frequencies of modern transmission systems increase, greater and more accurate equalization is required. Furthermore, although the loss distortion caused by even one or two degrees change in cable temperature is slight for one or two miles, it becomes far too large to ignore over long distances. The result is that modern cable transmission systems require automatic equalization, constantly changing as the cable temperature changes.

One network that is adaptable to automatic control is the well-known variable loss Bode type regulator network. Mr. H. W. Bode has explained his equalizing network in detail in his article "Variable Equalizers", *Bell System Technical Journal*, Volume 17 (April 1938), pages 229–244. Application of the Bode network to the L-4 Coaxial Transmission System is also explained in *The Bell System Technical Journal*, Volume 48 (April 1969), pages 865–887. The Bode network is of a bridged T constant resistance form terminated in a control resistor. Varying the resistance of the control resistor varies the insertion loss of the network without altering the basic shape of the loss versus frequency curve; the loss remains proportional to the square root of frequency. Equalization is achieved, therefore, by using a fixed amplification coupled with a Bode equalizer the loss curve of which is the inverse of the cable loss variation. Several Bode networks may be cascaded to achieve the desired accuracy. Additionally, Bode networks with a loss curve that is the same as cable loss shape may be used as line buildout networks to make up for shorter lengths of cable between repeaters.

Where all of the correction required by a length of cable can be applied at the receiving end, satisfactory systems have been devised that use feedback from the distorted signal to control the Bode equalizer. It has been found to be of considerable advantage, however, to provide part of the equalizer correction at the sending end of a length of cable; that is, to predistort the signals in such a manner that transmission over the cable will correct them. This process, known as preregulation, therefore requires an accurate mapping of the cable distortion without any feedback correction.

Since the loss distortion at a single frequency is essentially a linear function of both cable temperature and cable length, it would not seem too difficult to provide accurate preregulation if only the equalizer characteristic itself were linear and a control signal that is linear with temperature were available. Unfortunately, however, the resistance of the thermistor, which is commonly used to sense temperature, is not a linear function of the temperature. Furthermore, the Bode equalizer does not produce a loss characteristic that is a linear function of the control resistance. Because of these factors, previous attempts at preequalization have been less accurate than is required over the modern wider band systems. In one system, a cable temperature sensing thermistor controls the power output of an oscillator, which in turn contributes to the heating of a thermistor that controls the Bode equalizer. In spite of several circuit adjustments, however, the equalization applied just does not match the distortion produced to a close enough degree.

An object of this invention is a single frequency loss variation from the Bode equalizer that is a linear function of the inverse of a control signal.

Another object is a single frequency loss variation of the Bode equalizer that is a linear function of cable temperature.

Still another object of this invention is a linear control circuit for the Bode equalizer with a readily adjustable intercept and slope.

SUMMARY OF THE INVENTION

The control signal is applied to one input of a differential amplifier through amplifying means and to a voltage divider comprising the Bode network control resistor and a resistance substantially equal to the reference resistance of the Bode network. The voltage across the control resistor is applied to the other input of the differential amplifier. The output voltage of the differential amplifier is held constant by a feedback loop that adjusts the resistance of the control resistor in response to the output of the differential amplifier. The single frequency insertion loss of the Bode network is thereby made a linear function of the inverse of the control signal. The Bode control resistor may be a thermistor with a thermal connection to the feedback network. The slope and intercept of the function may be controlled by the control signal voltage and the gain of the amplifying means respectively. In addition, if a control signal is applied that is inversely proportional to temperature, the insertion loss of the Bode network will be a linear function of temperature for any single frequency.

DETAILED DESCRIPTION

Figure 1:
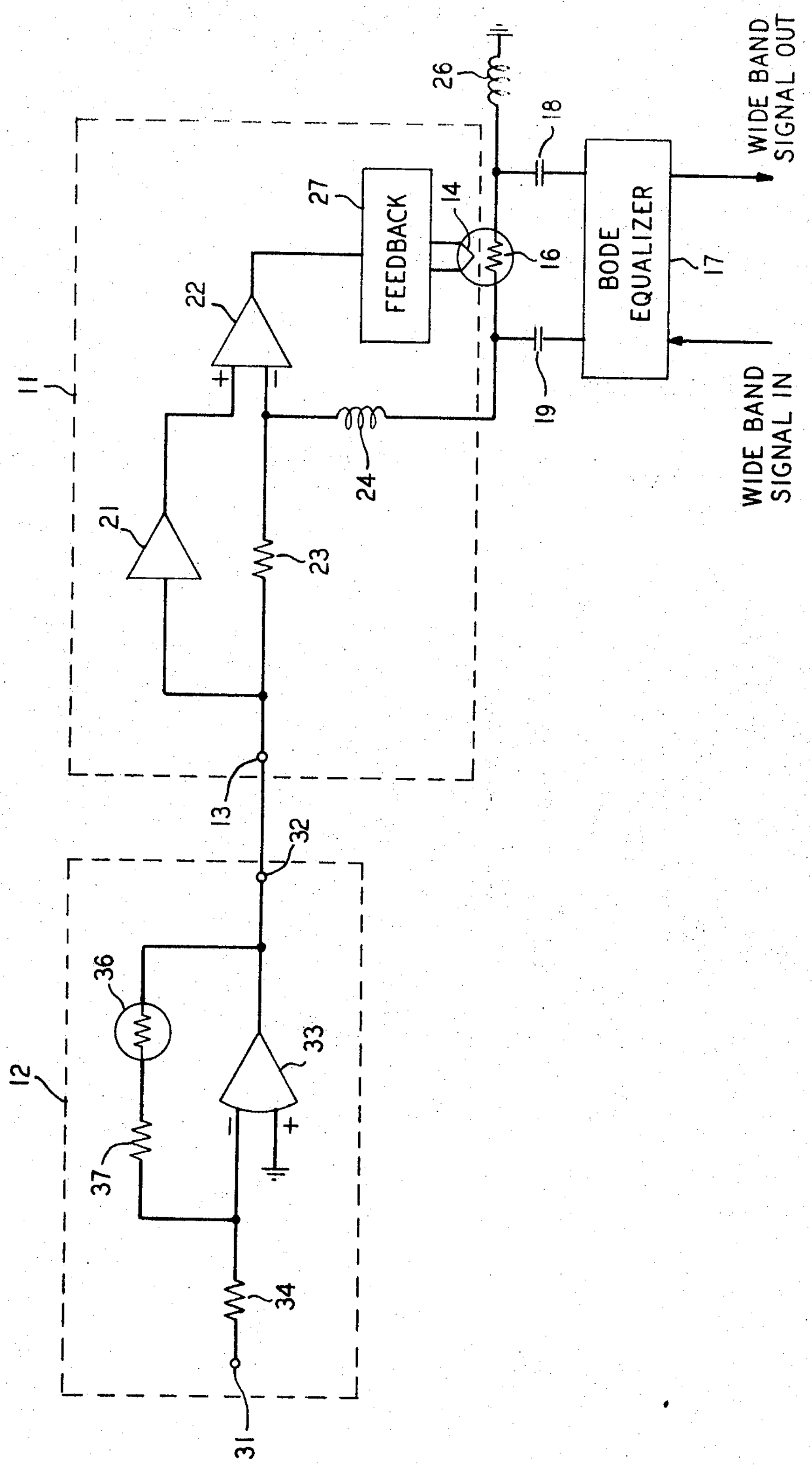
FIG. 1 is a block diagram illustrating a basic embodiment of the invention.

The block diagram of FIG. 1 shows two independent circuits 11 and 12, respectively, enclosed in dotted lines. Circuit 11 includes an input terminal 13 for connection to a dc signal source; its output, however, is in the form of heat from the heater 14 of an indirectly heated thermistor 16. Thermistor 16 is the control resistor of a Bode type variable loss equalizer 17 and is connected thereto by a pair of capacitors 18 and 19, respectively. The input of an amplifier 21 is connected to input terminal 13; its output is connected to one input of a differential amplifier 22. The other input of amplifier 22 is connected through a resistor 23 to input terminal 13 and through indirectly heated thermistor 16 to ground. A pair of chokes 24 and 26, respectively, are connected in series with thermistor 16 to keep the ac signal that is being equalized in Bode equalizer 17 from entering dc control circuitry 11. The output of differential amplifier 22 is connected to a feedback network 27, which controls the current into heater 14 to maintain the output of differential amplifier 22 at a fixed reference voltage.

The value of resistor 23 is important to the operation of the circuit; it should be chosen to be equal to the reference resistance of Bode equalizer 17. This resistance is usually known for Bode type equalizers and is the resistance of the control resistor 16 at which the loss of the equalizer is not a function of frequency. When resistor 23 is of this value, the single frequency loss of Bode equalizer 17 becomes a linear function of the inverse of the voltage applied to terminal 13. In addition, if the gain of amplifier 21 is varied, the slope of this linear function remains constant, but the intercept is varied. The magnitude of voltage into terminal 13, on the other hand, determines the slope of the linear function.

The Bode network control resistor has been shown in this embodiment as indirectly heated thermistor 16. Although, because of its linearity, a thermistor is particularly well suited for this function, the invention is not limited thereto. Any ac resistance that can be controlled by the feedback network to hold the output of amplifier 22 constant will allow the circuit to function according to my invention. A motor driven rheostat or a diode bridge shunted by a transistor may be used, for example.

To more clearly understand the operation of circuit 11, consider that by common circuit theory the ratio of the output voltage of amplifier 22 to the voltage input at terminal 13 may be expressed as $$V_o/V_{13} = G_1G_2 - G_2\ (R_{16}/R_{23} + R_{16}) \quad (1)$$

where $G_1$ is the gain of amplifier 21, $G_2$ is the gain of amplifier 22 and $R_{16}$ and $R_{23}$ are the resistances of thermistor 16 and resistor 23, respectively. The single frequency loss of the Bode type equalizer as a function of the resistance of its control thermistor $R_c$, however, is given as $$L_{eq} = L_0 - \alpha\ (R_r - R_c/R_r + R_c) \quad (2)$$

where $R_r$ is the reference resistance of the Bode equalizer, $\alpha$ is a constant, and $L_0$ is the loss of the equalizer when the control resistance $R_c$ is equal to $R_r$. Solving Equation 2 for $R_c$ gives $$R_c = [R_r(L_{eq} - L_0 + \alpha)]/[L_0 - L_{eq} + \alpha] \quad (3)$$

Since in our embodiment of this invention resistor 23 is made equal to the reference resistance of the Bode equalizer $R_r$, and $R_{16}$ is the resistance of the control thermistor $R_c$, we may substitute Equation 3 into Equation 1 to produce $$\frac{V_o}{V_{13}} = G_1G_2 - G_2\left[\frac{R_r\dfrac{L_{eq}-L_0+\alpha}{L_0-L_{eq}+\alpha}}{R_r+R_r\dfrac{L_{eq}-L_0+\alpha}{L_0-L_{eq}+\alpha}}\right] \quad (4)$$

which by algebraic manipulation, reduces to $$V_o/V_{13} = [G_1G_2 - G_2/2\alpha](L_{eq} - L_0 + \alpha) \quad (5)$$

Since feedback circuit 27 operates to adjust the resistance of thermistor 16 so that the output of amplifier 22 remains fixed at a value which may be normalized to unity, we may substitute 1 for $V_o$ in Equation 5 and find the single frequency loss of the equalizer as $$L_{eq} = 2G_1\alpha + L_0 - \alpha - (2\alpha/G_2V_{13}) \quad (6)$$

$G_1$, $G_2$, $\alpha$ and $L_0$ all being constants, Equation 6 may be reduced to $$L_{eq} = K_1 - K_2/V_{13} \quad (7)$$

where $K_1 = \alpha(2G_1 - 1) + L_0$ and $K_2 = 2\alpha/G_2$, showing that the single frequency loss of the equalizer is indeed a linear function of the inverse of the voltage fed into terminal 13. Furthermore, it can be seen from Equation 6 that the gain of amplifier 21 controls only the intercept of the plot of $L_{eq}$ against $1/V_{13}$, and that the gain of amplifier 22 may be used to control the slope. These properties of circuit 11 allow the Bode equalizer to be operated as a variable line buildout network while maintaining its ability to compensate for temperature dependent cable loss variations.

Circuit 12 of FIG. 1 is useful for providing an output voltage that is an inverse linear function of temperature. Circuit 12 includes an input terminal 31 for connection to a signal source and an output terminal 32. The inverting input terminal of an operational amplifier 33 is connected through a resistor 34 to input terminal 31, the noninverting input of amplifier 33 being grounded. A feedback path connected between the output and the inverting input of amplifier 33 includes a thermistor 36 and a resistance 37 connected in series. If the proper value is chosen for resistor 37, the output of amplifier 33 will be inversely proportional to the temperature of thermistor 36.

To better understand circuit 12, consider that the resistance of a thermistor as a function of its temperature is given as $$R_t = R_0e^{\beta}[1/T - 1/T_0] \quad (8)$$

where $R_0$ is the resistance of the thermistor at its reference temperature $T_0$, T is the thermistor temperature, $e$ is the base of natural logarithms and $\beta$ is a constant.

If $R_t$ is plotted against 1/I, the curve can be approximated over the limited temperature range of interest by a straight line, specified by $$R_t \approx a/T - b \quad (9)$$

where $-b$ is the intercept and $a$ is the slope. Consider also that the voltage gain of a feedback controlled inverting operational amplifier is approximately equal to the negative ratio of feedback resistance to input resistance $$G \approx -R_f/R_i. \quad (10)$$

For the circuit of FIG. 1, therefore, the feedback resistance is $R_{37} + R_t$. If the value of $R_{37}$ is made equal to $b$ of Equation 9, the feedback resistance becomes $$R_f \approx b + (a/T) - b = a/I. \quad (11)$$

If in addition, the value of the input resistance $R_{34}$ is made equal to $a$, the gain of circuit 12 becomes $$G \approx -1/I. \quad (12)$$

Thus the output voltage for circuit 12 is the negative of the input voltage divided by the absolute temperature of thermistor 36.

A very useful control circuit is therefore formed when circuits 11 and 12 are joined as shown in FIG. 1. Thermistor 36 may be placed in the vicinity of the cable to be equalized above or below ground, so as to be at cable temperature at all times. When an input voltage $V_t$ is applied at terminal 31, the voltage at terminal 32 becomes $-V_t/T$, and the single frequency loss of Bode equalizer 17 becomes $$L_{eq} = 2G_1\alpha + L_0 - \alpha + (2\alpha T/G_2V_t). \quad (13)$$

The loss of the Bode equalizer has thus been made a linear function of the temperature of the cable. To provide gain variation in the proper direction, $V_t$ is chosen negative. The gain $G_2$ of amplifier 22 can be designed to provide optimum operation of feedback network 27. The slope of the curve of cable temperature against single frequency equalizer loss can be readily adjusted for any length of cable by the magnitude of input voltage $V_t$, and the intercept of the curve can be readily adjusted at any one temperature by varying the gain $G_1$ of amplifier 21. The result is a very accurate equalization of temperature related cable loss over a wide range of temperature without feedback from the transmitted signal.

Burying the temperature sensing thermistor in the ground can give rise to voltage breakdown problems. It is common practice to provide the power to operate equalizers in the form of direct current sent along the line, the equalizers being individually connected in series in the power circuit. With long lines, where there are many equalizers between power sources, this results in very high voltages between equalizer circuits nearest the power supplies and earth ground. A circuit that is particularly useful in such situations is shown in FIG. 2.

In order to eliminate large voltage gradients between the temperature sensing thermistor 36 and earth ground, the thermistor is dc isolated but ac coupled to the equalizer circuit by a transformer 43. A suitable oscillator 41 drives operational amplifier 33 through a transformer 42 and input resistor 34. Thermistor 36 is connected in a feedback loop of amplifier 33 in series with resistor 37 by transformer 43. The values of resistors 34 and 37 are chosen as *a* and *b*, respectively, as discussed in connection with FIG. 1.

The output of operational amplifier 33 is fed to another operational amplifier 46 connected as a voltage peak detector. A potentiometer 44 is connected between the output of amplifier 33 and circuit ground 38. A coupling capacitor 47 and an input resistor 48 are connected in series between the tap of potentiometer 44 and the inverting input of operational amplifier 46. The negative feedback loop of amplifier 46 includes a diode 49 poled to feed back positive pulses and a feedback resistor 51. Negative output pulses are conducted by a diode 52 to charge a peak voltage holding capacitor 53. An operational amplifier 54 connected as a noninverting amplifier acts as a buffer to apply the voltage across capacitor 53 to junction 113.

Figure 2:
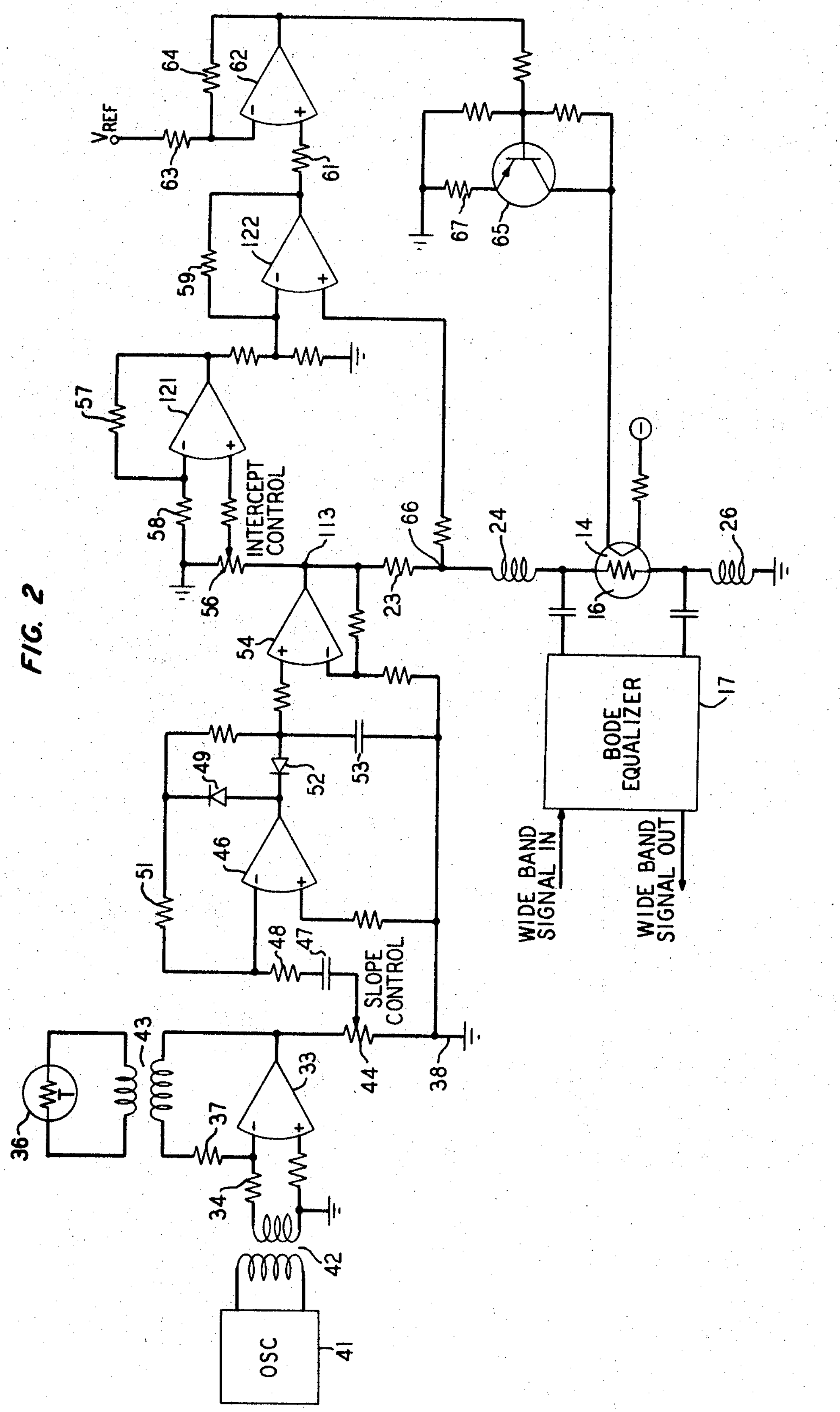
FIG. 2 is a schematic diagram illustrating a particularly useful embodiment of the invention.

The remainder of the circuit of FIG. 2 is a more detailed embodiment of circuit 11 of FIG. 1. A potentiometer 56 connects junction 113 to circuit ground. The tap of potentiometer 56 is connected through a suitable input resistor to the noninverting input of amplifier 121. Resistors 57 and 58 determine the feedback ratio of amplifier 121, and potentiometer 56 determines the proportion of signal fed into the amplifier to act as a gain control. Resistor 23 connects junction 113 to the Bode control thermistor 16 as in FIG. 1. The output of amplifier 121 is applied through a voltage dividing network to the inverting input of operational amplifier 122. The noninverting input of amplifier 122 is connected through a resistor to the junction of resistor 23 and isolating choke 24. A suitable feedback resistor 59 determines the gain of amplifier 122.

The feedback circuit designated by the number 27 in FIG. 1 is illustrated in FIG. 2 as a voltage reference source, a high gain differential amplifier and a transistor amplifier. The output of amplifier 122 is connected through an input resistor 61 to the noninverting input of an operational amplifier 62 used as a differential amplifier. The inverting input of amplifier 62 is connected to a voltage reference source, $V_{REF}$, through resistor 63. The feedback resistor 64 determines the gain of amplifier 62. The output of amplifier 62 is connected through a suitable resistor to the base of a p-n-p transistor 65. The emitter of transistor 65 is connected through an emitter resistor 67 to circuit ground, and the collector of transistor 65 is connected to one side of heater 14 of indirectly heated thermistor 16. The other side of heater 14 is connected through suitable limiting resistance to a source of negative dc. Biasing resistors are connected between base and collector of transistor 65 and base and ground.

The circuit of FIG. 2 operates as follows:

The output of amplifier 33 is an ac signal, the amplitude of which, because of resistors 34 and 37 and transformer 43, is a linear function of the inverse of the temperature of thermistor 36. Amplifier 46 with its associated circuitry, half wave rectifies the signal from amplifier 33 and charges capacitor 53 to a value proportional to the peak signal amplitude, the off-ground end of capacitor 53 being negative. Amplifier 54 merely isolates capacitor 53 and provides a negative output signal to junction 113. Potentiometer 44 controls the amplitude of signal fed to the peak voltage detector and hence $V_t$ of Equation 13. It is thus one convenient means of adjusting the equalizer correction for any length of cable. It controls the slope of the curve of single frequency equalizer loss against cable temperature. Alternatively, of course, other controls for the signal amplitude to junction 113 could be used; for example, the gain of amplifier 54 or the output of oscillator 41.

Potentiometer 56 controls the amount of signal fed to amplifier 121 and hence has the same effect as a gain control for amplifier 121. It therefore controls $G_1$ of Equation 13 and sets the intercept of the curve of single frequency equalizer loss against cable temperature. Amplifier 122 amplifies the difference between the negative signal out of amplifier 121 and the negative signal at junction 66 to give a positive output equal to the reference voltage. Should the output of amplifier 122 drop below the reference voltage, the output of differential amplifier 62 will become negative, reducing the resistance of transistor 63 to increase the current through heater 14. As thermistor 16 heats up, its resistance will drop, making the voltage at junction 66 less negative. Since this voltage is applied to the noninverting input of amplifier 122, the less negative input will result in more positive output offsetting the original hypothetical voltage drop. In this manner, the output of amplifier 122 is clamped to the reference voltage. Thus the conditions of Equations 6 and 13 are met, and the loss of equalizer 17 has been made a linear function of the temperature of thermistor 36. The equalizer will therefore accurately preregulate the cable over the temperature range it will experience. Furthermore, control 44 provides means for setting the sensitivity for different lengths of cable and control 56 for making the original alignment.

I claim:

1. A control circuit for controlling the loss characteristic of a Bode type variable loss network having a control resistance element and a reference resistance comprising an input terminal for the application of a control signal, a common terminal, a differential amplifier having first and second inputs and an output, amplifying means for changing the amplitude of said control signal connected between said input terminal and said first input of said differential amplifier, a resistor having a resistance value substantially equal to the reference resistance of said Bode network connected between said input terminal and said second input of said differential amplifier, said control resistance element being connected between said common terminal and said second input of said differential amplifier, and feedback means connected to the output of said differential amplifier, and to said control resistance element for adjusting the resistance of said control resistance element to keep the output of said differential amplifier at a predetermined voltage, whereby the loss characteristic of said Bode network is an inverse linear function of said control signal.

2. A control circuit as in claim 1 including means for adjusting the amplification of said amplifying means thereby adjusting the intercept of said linear loss characteristic.

3. A control circuit as in claim 1 wherein said control resistance element is a control thermistor thermally connected to said feedback means.

4. A control circuit as in claim 3 wherein said feedback means comprises a reference terminal for connection to a source of reference voltage, comparator means connected to said reference terminal and the output of said differential amplifier for producing a feedback signal proportional to the difference between the output voltage of said differential amplifier and said reference voltage, a heater disposed to heat said control thermistor and control means connected between said heater and said comparator means for varying the current through said heater in response to said feedback signal.

5. A control circuit as in claim 1 including a temperature sensing means for producing a temperature signal that is approximately a linear inverse function of ambient temperature connected to said input terminal whereby the loss characteristic of said Bode network is a linear function of said ambient temperature.

6. A control circuit as in claim 5 including means for adjusting the amplitude of said temperature signal thereby adjusting the slope of said linear loss characteristic.

7. A control circuit as in claim 5 wherein said temperature sensing means comprises an operational amplifier having an inverting input and an output, a driving terminal for connection to a source of driving voltage, a temperature sensing thermistor, a feedback resistor having a resistance $b$ connected in a feedback loop with said temperature sensing thermistor between the output and the inverting input of said operational amplifier, and an input resistor having a resistance $a$ connected between said driving terminal and said inverting input, the resistance of said temperature sensing thermistor $R_t$, the temperature of said temperature sensing thermistor $t$ and the values $a$ and $b$ being approximately related by the expression $R_t = a/t - b$.

8. A control circuit as in claim 7 wherein said driving voltage is alternating and said temperature sensing thermistor is connected in said feedback loop by transformer coupling, and including rectifying means connected between said temperature sensing means and said input terminal.

* * * * *

UNITED STATES PATENT OFFICE
CERTIFICATE OF CORRECTION

Patent No. 3,750,007 Dated July 31, 1973

Inventor(s) Richard K. Nelson

It is certified that error appears in the above-identified patent and that said Letters Patent are hereby corrected as shown below:

Column 3, line 30, Equation (1) should read:

$$V_o/V_{13} = G_1G_2 - G_2R_{16}/(R_{23} + R_{16})$$

Column 3, line 38, Equation (2) should read:

$$L_{eq} = L_0 - \alpha(R_r - R_c)/(R_r + R_c)$$

Column 3, line 61, Equation (5) should read:

$$V_o/V_{13} = G_1G_2 - (G_2/2\alpha)(L_{eq} - L_0 + \alpha)$$

Column 4, line 54, Equation (11) should read:

$$R_f \approx b + (a/T) - b = a/T$$

Column 4, line 58, Equation (12) should read:

$$G \approx - 1/T$$

Signed and sealed this 16th day of April 1974.

(SEAL)
Attest:

EDWARD M.FLETCHER,JR.
Attesting Officer

C. MARSHALL DANN
Commissioner of Patents